United States Patent
Laufer et al.

(10) Patent No.: US 9,738,755 B2
(45) Date of Patent: *Aug. 22, 2017

(54) MOLDING POLYAMIDES, METHODS FOR THE PRODUCTION THEREOF, AND USE THEREOF

(71) Applicant: Rhein Chemie Rheinau GmbH, Mannheim (DE)

(72) Inventors: Wilhelm Laufer, Ellerstadt (DE); Armin Eckert, Oberhausen-Rheinhausen (DE); Andre Palzer, Reilingen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/402,612

(22) PCT Filed: Mar. 22, 2013

(86) PCT No.: PCT/EP2013/056149
§ 371 (c)(1),
(2) Date: Nov. 20, 2014

(87) PCT Pub. No.: WO2013/174545
PCT Pub. Date: Nov. 28, 2013

(65) Prior Publication Data
US 2015/0218314 A1   Aug. 6, 2015

(30) Foreign Application Priority Data

May 22, 2012   (EP) ..................... 12168904

(51) Int. Cl.
| C08G 69/14 | (2006.01) |
| C08G 69/18 | (2006.01) |
| C08L 77/02 | (2006.01) |
| C08G 18/28 | (2006.01) |
| B29C 39/00 | (2006.01) |
| B29K 77/00 | (2006.01) |
| B29L 7/00 | (2006.01) |
| B29L 31/32 | (2006.01) |

(52) U.S. Cl.
CPC ............. C08G 69/14 (2013.01); C08G 69/18 (2013.01); *B29C 39/003* (2013.01); *B29K 2077/00* (2013.01); *B29L 2007/00* (2013.01); *B29L 2031/324* (2013.01); *C08G 18/2855* (2013.01); *C08L 77/02* (2013.01)

(58) Field of Classification Search
CPC ...... C08L 77/02; C08G 18/2855; C08G 69/18
See application file for complete search history.

(56) References Cited

U.S. PATENT DOCUMENTS

| 3,418,268 A | 12/1968 | Hedrick |
| 3,575,938 A * | 4/1971 | Tierney ...................... 528/315 |
| 4,582,879 A | 4/1986 | Frisch et al. |
| 4,684,746 A * | 8/1987 | Meyer .................... C08G 18/10 564/38 |
| 4,742,128 A | 5/1988 | Frisch et al. |
| 7,067,654 B2 | 6/2006 | Richter et al. |
| 8,802,809 B2 * | 8/2014 | Laufer et al. ................. 528/323 |
| 2009/0306332 A1 * | 12/2009 | Kray ..................... C08G 69/20 528/323 |
| 2012/0245320 A1 * | 9/2012 | Laufer et al. ................. 528/315 |
| 2014/0225032 A1 | 8/2014 | Laufer et al. |

FOREIGN PATENT DOCUMENTS

| JP | 05170896 A | 7/1993 |
| WO | 2012045806 A1 | 4/2012 |

OTHER PUBLICATIONS

Sysel, P. et al., (XP009164038) "Influence of the Composition of initiation system on anionic polymerization of 6-hexanolactam in the presence of diazabicyclo(2,2,2) octoane" Scientific Papers of the University of Chemical Technology Prague, Coden, 1993, pp. 26-34.
Laufer, W., "Molding polyamides, methods for the production thereof, and use thereof", English Translation of WO 2013174545 A1, Nov. 28, 2013, p. 1-9.
International Search Report from co-pending Application PCT/EP2013/056149 dated May 3, 2013, 3 pages.

* cited by examiner

*Primary Examiner* — Gregory Listvoyb

(57) ABSTRACT

The present invention relates to novel cast polyamides, to processes for production thereof and to the use thereof.

16 Claims, No Drawings

MOLDING POLYAMIDES, METHODS FOR THE PRODUCTION THEREOF, AND USE THEREOF

The present invention relates to novel cast polyamides, to processes for production thereof and to the use thereof.

Cast polyamides are polyamides of particularly high molecular weight. In the production of cast polyamides, a lactam is poured into a mold together with at least one catalyst and at least one activator and then anionically polymerized in this mold. This involves polymerization of the starting compounds present in the mold, generally with heating. This gives rise to a homogeneous material which is superior to extruded polyamides in terms of crystallinity.

Cast polyamides are suitable as thermoplastics for the production of complex components. In contrast to many other thermoplastics, there is no need to melt them; instead, they form through an anionic polymerization of a lactam in a mold at 120 to 150° C. within just a few minutes. This can be done by any known casting method, such as stationary casting, injection casting, rotary casting and centrifugal casting. The end products obtained in each case are moldings of a crystalline polyamide of high molecular weight which features a low weight, high mechanical durability, very good sliding properties and excellent chemical resistance, and which—since the molds are not filled under pressure—has only low internal stresses. Cast polyamides can be sawed, drilled, machined, ground, welded and printed or painted; as well as complex hollow molds, examples of other articles produced from this polymer are rollers for passenger elevators and semifinished products, for example tubes, bars and sheets for mechanical engineering and the automobile industry.

The production of cast polyamide pans proceeding from low-viscosity lactam melts and a catalyst, and also an activator, by what is called activated anionic polymerization is known per se. For this purpose, it is customary to commix two mixtures of catalyst and lactam and of activator and lactam in the form of a liquid melt and then to polymerize them in the casting mold; see EP 2447302 and WO2012/045806. Disadvantages of the current cast polyamides are, however, the high temperatures necessary in the course of production and the high proportions of activator that make the procedure uneconomic. Further disadvantages in the production of cast polyamide parts by the injection casting process are the long processing times, which make production uneconomic. It was thus an object of the present invention to provide cast polyamides which can be produced with short processing times and/or at low temperatures, and which do not have the disadvantages of the prior art.

It has now been found that, surprisingly, the inventive cast polyamides have this profile of properties.

The present invention thus provides cast polyamides obtainable by the reaction of
a) at least one catalyst for the anionic polymerization of lactams;
b) at least one activator for the anionic polymerization,
c) at least one ten-amine and/or dibutyltin dilaurate as coactivator and
d) at least one lactam at temperatures of at least 80° C. to 130° C., preferably 110 to 130° C.

In a preferred embodiment of the invention, the catalyst is at least one compound selected from the group of the lactam magnesium halides, alkali metal aluminodilactamates and alkali metal and/or alkaline earth metal lactamates.

Catalysts used in the context of the invention may be lactam magnesium halides, preferably bromides, alkali metal aluminodilactamates, preferably sodium, alkali metal and/or alkaline earth metal lactamates, preferably sodium, potassium and/or magnesium, individually or in a mixture, the terms "halides", "alkali metal" and "alkaline earth metal" having the meaning corresponding to that from the Periodic Table of the Elements.

The aforementioned catalysts are commodity chemicals and are available, for example from Rhein Chemie Rheinau GmbH or from KatChem spol.s.r.o.

Activators used in the context of the invention may be isocyanates, isocyanurates, biurets, allophanates, uretdiones and/or carbodiimides, as a single compound or in the form of a mixture. Likewise usable in the context of the invention are activators which have been blocked, for example by lactams, more preferably caprolactam, or by phenols, oximes and/or epoxides, and likewise solvent-containing activators. Suitable solvents are: N-alkylpyrrolidones, preferably N-methylpyrrolidone and N-ethylpyrrolidone, polyglycols, preferably polyglycol DME 200, dipropylene glycol DME or tetraethylene glycol DME.

Isocyanates in the context of the invention are preferably diisocyanates, preferably 2,4-tolylene diisocyanate (TDI), 2,6-tolylene diisocyanate, a mixture of 2,4-tolylene diisocyanate and 2,6-tolylene diisocyanate, hexamethylene 1,6-diisocyanate, cyclohexane 1,4-diisocyanate, xylylene diisocyanate, isophorone diisocyanate, 1,5-naphthalene diisocyanate, 4,4'-diphenylmethane diisocyanate, 2,4'-diphenylmethane diisocyanate, 2,2'-diphenylmethane diisocyanate, 4,4'-diphenyldimethylmethane diisocyanate, 1,3-phenylene diisocyanate, 1,4-phenylene diisocyanate, dicyclohexylmethane 4,4'-diisocyanate, dicyclohexylmethane 2,4'-diisocyanate, dicyclohexylmethane 2,2'-diisocyanate, methylcyclohexane diisocyanate, tetramethylxylylene diisocyanate, 2,6-diisopropylphenylene isocyanate and mixtures thereof. Particular preference is given to hexamethylene 1,6-diisocyanate. The aforementioned compounds are commodity chemicals and are available, for example from Bayer MalerialScience AG.

Isocyanurates in the context of the invention are preferably compounds of the formula (I)

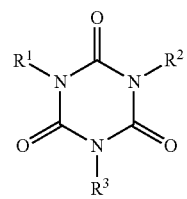

where $R^1$, $R^2$ and $R^3$ are each independently —$(CH_2)_m$—N=C=O or —$(CH_2)_q$—$[(C_6H_3)((Me/Et)_3(N=C=O)]$, and m=1-12, q=0-6 and Me is methyl and Et is ethyl, where $R^1$, $R^2$ and $R^3$ are preferably the same.

Preference is given to the following compounds of the formula (II)

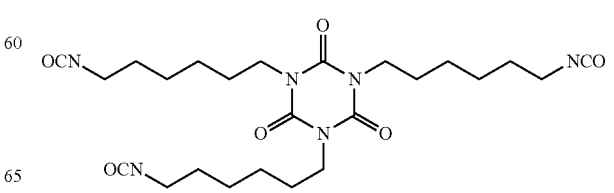

and of the formula (III)

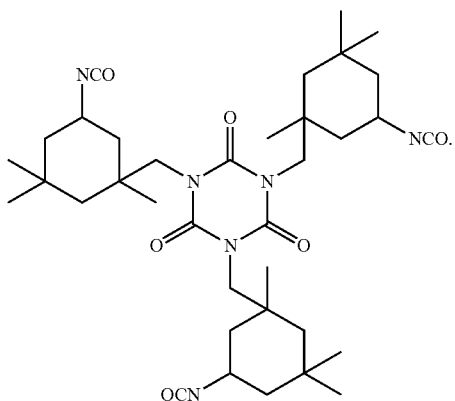

The aforementioned compounds are commodity chemicals and are available, for example from Bayer MaterialScience AG.

Biurets in the context of the invention are preferably compounds of the formula (IV)

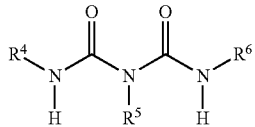

where $R^4$, $R^5$ and $R^6$ are each independently —$(CH_2)_p$—N=C=O, with p=1-12, where
$R^4$, $R^5$ and $R^6$ are preferably the same. In a particularly preferred embodiment, $R^4$, $R^5$ and $R^6$ correspond to —$(CH_2)_p$—N=C=O and p is 6, i.e. a biuret of the formula (V)

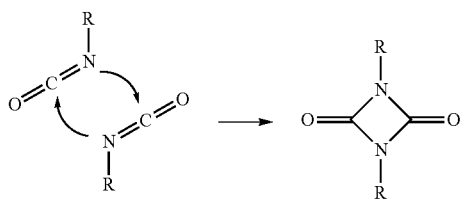

The aforementioned compounds are commodity chemicals and are available, for example from Bayer MaterialScience AG.

Uretdiones in the context of the invention are reaction products of at least two isocyanates with the formation of dioxodiazetidine bonds:

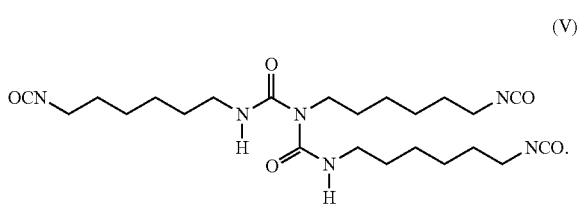

The preparation is known per se to those skilled in the art. The compounds can be prepared, for example, by the processes described in EP 1 422 223 A1.

The uretdione may be a dimer, trimer, oligomer or polymer.

Suitable examples of uretdiones are known per se to those skilled in the art. Preference is given to uretdiones which are obtained proceeding from an aliphatic or aromatic isocyanate. The aromatic isocyanates have preferably 6 to 20 carbon atoms, more preferably 6 to 15 carbon atoms. Corresponding aromatic monomeric isocyanates may be selected, for example, from the group consisting of 2,4-diisocyanatotoluene, 2,6-diisocyanatotoluene, 1,5-naphthylene diisocyanate, 4,4'-methylenediphenyl diisocyanate, 1,3-bis(3-isocyanato-4-methylphenyl)-2,4-dioxodiazetidine, N,N'-bis(4-methyl-3-isocyanatophenyl)urea and tetramethylxylylene diisocyanate. Of these aromatic isocyanates, preference is given to 2,4-diisocyanatotoluene, 2,6-diisocyanatotoluene and 4,4'-methylenebis(phenyl diisocyanate). Especially preferred are 2,6-diisocyanatotoluene and 4,4'-methylenebis(phenyl diisocyanate).

The aliphatic isocyanates have preferably 6 to 20 carbon atoms, more preferably 6 to 15 carbon atoms. Corresponding aliphatic monomeric isocyanates may be selected, for example, from the group consisting of isophorone diisocyanate, cyclohexyl 1,4-diisocyanate, 1,1-methylenebis(4-isocyanatocyclohexane), 1,2-bis(4-isocyanatononyl)-3-heptyl-4-pentyl-cyclohexane and hexamethylene 1,6-diisocyanate. Preference is given here to the use of isophorone diisocyanate and hexamethylene 1,6-diisocyanate.

The aforementioned compounds are commodity chemicals and are available, for example from Rhein Chemie Rheinau GmbH or Bayer MaterialScience AG.

Allophanates in the context of the invention are preferably compounds of the formula (VI)

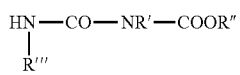

where R' and R" are each independently an alkyl radical having 1 to 20 carbon atoms or an aryl radical having 6 to 20 carbon atoms,
and R'" is defined as an alkyl radical having 1 to 20 carbon atoms.

These compounds are generally obtainable by reaction of any desired starting compounds containing urethane and/or urea groups, containing units of the general formula (R"OOC—NHR'), with monoisocyanates of the general formula R'"—NCO or with diisocyanates of the general formula OCN-A-NCO, where R'" or A is preferably an alkyl radical having 1 to 20 carbon atoms or an aryl radical having 6 to 20 carbon atoms, and R' and R" are each independently an alkyl radical having 1 to 20 carbon atoms or an aryl radical having 6 to 20 carbon atoms.

Suitable monoisocyanates are any desired aromatic, aliphatic and cycloaliphatic monoisocyanates having up to 20 carbon atoms, such as methyl isocyanate, isopropyl isocyanate, n-butyl isocyanate, n-hexyl isocyanate, cyclohexyl isocyanate, stearyl isocyanate, the optionally halogenated phenyl isocyanates, 1-naphthyl isocyanate, the optionally chlorinated or fluorinated m-, o- and p-tolyl isocyanates, p-isopropylphenyl isocyanate, 2,6-diisopropylphenyl isocyanate and p-toluenesulfonyl diisocyanate.

Suitable diisocyanates are any desired aromatic, aliphatic and cycloaliphatic diisocyanates having 6 to 40 carbon atoms, preferably 6 to 15 carbon atoms, such as isophorone diisocyanate, cyclohexyl 1,4-diisocyanate, 1,1-methylenebis (isocyanatohexane), 1,2-bis(4-isocyanatononyl)-3-heptyl-4-pentylcyclohexane, hexamethylene 1,6-diisocyanate, 2,4-diisocyanatotoluene, 2,6-diisocyanatotoluene, 1,5-naphthylene diisocyanate, 4,4'-methylenediphenyl diisocyanate, 1,3-bis(3-isocyanato-4-methylphenyl)-2,4-dioxodiazetidine, N,N'-bis(4-methyl-3-isocyanatophenyl)urea and tetramethylxylylene diisocyanate. Among these, preference is given to hexamethylene 1,6-diisocyanate.

The allophanates particularly preferred in the context of the present invention are compounds of the formula (VI)

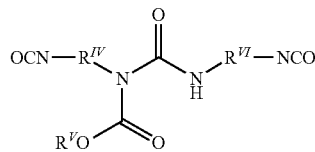

where $R^{IV}$ and $R^{VI}$ within the molecule may be the same or different and are each $C_1$-$C_6$-alkyl, preferably —$(CH_2)_6$—, and $R^V$ is $C_1$-$C_6$-alkyl.

Corresponding allophanates and the preparation thereof are described, for example, in EP 0 000 194A, the disclosure of which in this regard is incorporated by reference into the present invention. The aforementioned compounds are commodity chemicals and are available, for example from Bayer MaterialScience AG.

Carbodiimides in the context of the invention are preferably compounds of the formula (VIII)

$$R^{11}-(-N=C=N-R^{12}-)_m-R^{13} \qquad (VIII)$$

in which m is an integer from 1 to 500.

$R^{12}$ is $C_1$-$C_{18}$-alkylene, $C_5$-$C_{18}$-cycloalkylene, arylene and/or $C_7$-$C_{18}$-aralkylene, $R^{11}$ is R—NCO, R—NHCONHR$^9$, R—NHCONR$^9$R$^7$ or R—NHCOOR$^8$ and $R^{13}$ stands —NCO, —NHCONHR$^9$, —NHCONR$^9$R$^7$ or —NHCOOR$^8$ stands, where, in $R^{11}$, $R^9$ and $R^7$ are the same or different and are independently a $C_1$-$C_6$-alkyl, $C_6$-$C_{10}$-cycloalkyl or $C_7$-$C_{18}$-aralkyl radical and $R^8$ has one of the definitions of $R^{11}$ or is a polyester or polyamide radical or —$(CH_2)_hO$—$[(CH_2)_k$—$O]_g$—$R^{10}$, with h=1-3, k=1-3, g=0-12, where $R^{10}$ is defined as H or $C_1$-$C_4$-alkyl.

Likewise usable are also mixtures of carbodiimides of the formula (VIII), including the corresponding oligomers and/or polymers, preference being given to polymeric carbodiimides.

The compounds of the formula (VIII) are commercially available, for example from Rhein Chemie Rheinau GmbH, or can be prepared by the processes familiar to the person skilled in the art, as described, for example, in DE-A-11 30 594 or U.S. Pat. No. 2,840,589, or by the condensation of diisocyanates with elimination of carbon dioxide at elevated temperatures, for example at 40° C. to 200° C., in the presence of catalysts. Useful catalysts have been found to be, for example, strong bases or phosphorus compounds. Preference is given to using phospholene oxides, phospholidines or phospholine oxides, and the corresponding sulfides. It is also possible to use, as catalysts, tertiary amines, basic metal compounds, metal carboxylates and non-basic organometallic compounds.

The aforementioned compounds are commodity chemicals and are available, for example from Rhein Chemie Rheinau GmbH.

Blocked activators, preferably blocked with lactams, more preferably caprolactam, or activators blocked with phenols, oximes and/or epoxides are preparable, for example, via the reaction of at least one compound of the formula (I) to (VIII) with at least one lactam, caprolactam, phenols, oxime and/or epoxide at temperatures of 80 to 100° C. by the processes familiar to those skilled in the art.

In a further preferred involvement of the invention, the tert-amine coactivator is triethylenediamine, 1,3,5-tris(3-(dimethylamino)propyl, dimethylcyclohexylamine, N,N-dimorpholinodiethyl ether, bis(N,N-dimethylaminoethyl) ether, N-ethylmorpholine, pentamethyldipropylenetriamine and/or N,N-dimethylpiperazine.

The dibutyltin laurate and/or tertiary amine coactivators can, in a further embodiment of the invention, also optionally be used dissolved in solvents, for example glycols. The aforementioned compounds are commodity chemicals and are available, for example from Rhein Chemie Rheinau GmbH or BASF AG.

In a further preferred embodiment of the invention, the lactam d) is a compound of the general formula

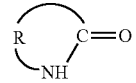

where R is an alkylene group having 3 to 13 carbon atoms.

Preference is given here to caprolactam and/or laurolactam. These are commercially available, for example from Lanxess Deutschland GmbH.

In a further preferred embodiment, the inventive cast polyamide contains, based in each case on lactam, the following components Catalyst a): 0.1 to 3% by weight, preferably 0.2 to 1.5% by weight, Activator b): 0.1 to 2% by weight, preferably 0.5 to 1% by weight and Coactivator c): 0.0005 to 0.2% by weight, preferably 0.005 to 0.1% by weight.

In a preferred embodiment of the invention, the cast polyamide is obtainable by the reaction of a) sodium lactamate, preferably as an 18-20% by weight caprolactam solution, as catalyst, b) at least one representative selected from the group of hexamethylene 1,6-diisocyanate, caprolactam-blocked hexamethylene 1,6-diisocyanate, a biuret of the formula (IV) with p=6 and/or a uretdione based on 2,4-diisocyanatotoluene.

c) triethylenediamine and d) caprolactam.

In a further preferred embodiment, the inventive cast polyamide contains, based on lactam, the following components:

Catalyst a): 0.5 to 3% by weight, preferably 1 to 2% by weight, of sodium lactamate, preferably as an 18-20% by weight caprolactam solution, Activator b): 0.1 to 2% by weight, preferably 0.5 to 1% by weight, of at least one representative selected from the group of hexamethylene 1,6-diisocyanate, caprolactam-blocked hexamethylene 1,6-diisocyanate, biuret of the formula (IV) with p=6 and/or a uretdione based on 2,4-diisocyanatotoluene and Coactivator c): 0.0005 to 0.2% by weight, preferably 0.005 to 0.1% by weight, of triethylenediamine, based on caprolactam.

The present invention further provides a process for producing the inventive cast polyamides, in which
- at least one lactam melt is mixed with catalyst a) and optionally coactivator c) and
- at least one lactam melt is mixed with activator b) and optionally coactivator c)

and optionally
- a lactam melt is mixed with coactivator (c), where the coactivator c) must be present in at least one of the aforementioned lactam melts, at temperatures of 80° C. to 130° C., preferably in the range from 110 to 130° C., and polymerized in a mold.

This mixing operation is preferably effected continuously or batchwise, for example in a static mixer, stirred vessel, extruder, or with a conveying screw, within a period of 1 second to 10 minutes, preferably within the range from 1 to 120 seconds.

In one embodiment of the invention, lactam melt (a) and lactam melt (b) and optionally lactam melt (c) are combined at temperatures between 80 and 130° C., preferably 100 and 130° C., for polymerization. The polymerization is effected by the processes familiar to those skilled in the art, described, for example, in Kunststoffhandbuch [Plastics Handbook], vol. 3/4, Technische Thermoplaste [Industrial Thermoplastics], Hanser Fachbuch, pages 413-430. In the course of this, the lactam melts are preferably stirred. Mixing units can be used for this purpose, for example stirred tanks.

In a further embodiment of the invention, lactam melt (a) and lactam melt (b) and optionally lactam melt (c) are first cooled, compounded, stored and then melted, and combined at temperatures between 80 and 130° C., preferably 100 and 130° C., for polymerization.

In another embodiment of the invention, lactam melt (a) and lactam melt (b) and optionally lactam melt (c) are first mixed briefly at 80-90° C., cooled, compounded, stored and then melted, and combined at temperatures between 80 and 130° C., preferably 100 and 130° C., for polymerization.

In a further embodiment of the invention, further lactam and/or further catalyst a) and/or optionally further additives, such as impact modifiers, preferably polyetheramine copolymers, glass fibers, continuous glass fibers, carbon fibers, aramid fibers, and/or processing aids, for example high molecular weight polyols, thickeners, preferably Aerosils, UV stabilizers and thermal stabilizers, conductivity improvers, preferably carbon blacks and graphites, ionic liquids, labels and/or dyes, are added to the lactam melt (a) and/or lactam melt (b) and optionally lactam melt (c).

The lactam melt (a) and lactam melt (b) are preferably used in quantitative ratios of 1:3 to 3:1, more preferably in quantitative ratios of 1:1.

In a further preferred embodiment of the invention, the cast polyamide additionally comprises at least one further component selected from fillers and/or reinforcers, polymers and/or further additives which differ chemically from the catalyst and activator to be used.

Fillers and/or reinforcers in the context of the invention are organic or inorganic fillers and/or reinforcers. Preference is given to inorganic fillers, especially kaolin, chalk, wollastonite, talc, calcium carbonate, silicates, titanium dioxide, zinc oxide, graphite, graphenes, glass particles (e.g. glass beads), nanoscale fillers (such as carbon nanotubes), carbon black, sheet silicates, nanoscale sheet silicates, nanoscale aluminum oxide ($Al_2O_3$), nanoscale titanium dioxide ($TiO_2$) and/or nanoscale silicon dioxide ($SiO_2$).

Preference is further given to the use of fibrous materials as filler and/or reinforcer. The fillers and/or reinforcers are generally selected from the group comprising minerals in a grain size customary for thermoplastics applications, especially kaolin, chalk, wollastonite or talc, carbon fibers or glass fibers, preferably ground glass fibers, more preferably glass fibers and carbon fibers.

More preferably, one or more fibrous materials are used, selected from known inorganic reinforcing fibers, especially boron fibers, glass fibers, carbon fibers, silica fibers, ceramic fibers and basalt fibers; organic reinforcing fibers, especially aramid fibers, polyester fibers, nylon fibers, polyethylene fibers; and natural fibers, especially wood fibers, flax fibers, hemp fibers and sisal fibers. Especially preferred is the use of glass fibers, especially chopped glass fibers, carbon fibers, aramid fibers, boron fibers, metal fibers and/or potassium titanate fibers.

More particularly, it is also possible to use mixtures of said fillers and/or reinforcers. Particular preference is given to selecting, as fillers and/or reinforcers, glass fibers and/or glass particles, especially glass beads.

The amount of fillers and/or reinforcers to be used is preferably 30 to 90% by weight, especially 30-80% by weight, preferably 30 to 50% by weight, and further preferably from 50 to 90% by weight.

Polymers in the context of the invention are: polystyrene, styrene copolymers, especially styrene-acrylonitrile copolymers (SAN), acrylonitrile-butadiene-styrene copolymers (ABS) or styrene-butadiene copolymers (SB), polyphenylene oxide ethers, polyolefins, especially polyethylene (HTPE (high-temperature-polyethylene), LTPE (low-temperature-polyethylene), polypropylene or polybutene-1, polytetrafluoroethylene, polyesters, especially polyethylene terephthalate (PET); polyamides, polyethers, especially polyethylene glycol (PEG), polypropylene glycol or polyether sulfones (PESU or PES); polymers of monomers containing vinyl groups, especially polyvinyl chloride, polyvinylidene chlorides, polystyrene, impact-modified polystyrene, polyvinylcarbazole, polyvinyl acetate or polyvinyl alcohol, polyisobutylene, polybutadiene and/or polysulfones. It is additionally possible to use, as the polymer, copolymers consisting of the monomer units of the abovementioned polymers.

In a further embodiment of the invention, the polymer to be used may contain groups suitable for formation of block and/or graft copolymers with the polymers formed from the monomers. Examples of such groups are epoxy, amine, carboxylic anhydride, oxazoline, carbodiimide, urethane, isocyanate and lactam groups. Polymers having carbodiimide groups are used when no carbodiimide is used as activator.

Any polymer present is present preferably in an amount of 0 to 40% by weight, preferably of 0 to 20% by weight, more preferably in an amount of 0 to 10% by weight.

In a preferred embodiment, inventive composition comprises further additives. Preference is given to using the additives in an amount of 0 to 5% by weight, more preferably of 0 to 4% by weight, most preferably of 0 to 3.5% by weight. Additives added may preferably be stabilizers, especially copper salts, dyes, antistats, filler oils, stabilizers, surface improvers, siccatives, demolding aids, separating agents, antioxidants, light stabilizers, PVC stabilizers, lubricants, polyols, flame retardants, blowing agents, impact modifiers and/or nucleating aids.

Suitable impact modifiers are especially polydiene polymers, preferably polybutadiene, polyisoprene, containing anhydride and/or epoxy groups. The polydiene polymer especially has a glass transition temperature below 0° C., preferably below −10° C., more preferably below −20° C. The polydiene polymer may be based on the basis of a polydiene copolymer with polyacrylates, polyethylene acrylates and/or polysiloxanes, and be prepared by means of the standard processes, preferably by emulsion polymerization, suspension polymerization, solution polymerization, gas phase polymerization.

In a further preferred embodiment of the invention, polyol is used as an additive to improve impact resistance, available, for example, from Rhein Chemie Rheinau GmbH under the Addonyl® 8073 name. Likewise usable are polyol triamines suitable for improving low-temperature impact resistance. A suitable product is Addonyl® 8112. Preference is given to using the polyols in the concentration range of 1-20% by weight.

The optional addition of fillers and/or reinforcers and further additives may precede or coincide with the addition of catalyst and/or activator.

In a further execution of the present invention, the polymerization can be performed by a suitable shaping process, preferably injection casting, stationary casting processes, rotary casting processes.

The scope of the invention includes all general radical definitions, indices, parameters and illustrations mentioned above and below, and those mentioned in preferred ranges with one another, i.e. also any combinations between the respective ranges and preferred ranges.

The present invention further provides for the use of the inventive cast polyamide for the production of rollers, preferably for passenger elevators and semifinished products, preferably vessels, gears, tubes, bars and sheets for mechanical engineering and the automobile industry.

The examples which follow serve to illustrate the invention but have no limiting effect.

WORKING EXAMPLES

Reagents

Dry caprolactam (EP>69° C.) from Lanxess Deutschland GmbH

Addonyl® 8108 activator, a hexamethylene diisocyanate (HDI) biuret, 70% in N-ethylpyrrolidone, commercially available from Rhein Chemie Rheinau GmbH, Addonyl® Kat NL from Rhein Chemie Rheinau GmbH, about 18% sodium caprolactamate in caprolactam.

Addocat® 105=a triethylenediamine in dipropylene glycol, commercially available from Rhein Chemie Rheinau GmbH Addolink® TT=a TDI uretdione from Rhein Chemie Rheinau GmbH Equipment:
  The apparatus used to prepare the melt consisted of:
  2 three-neck flasks (500 ml), heated in an oil bath
  2 precision glass stirrers with sleeves
  2 gas caps, 1 with and 1 without a tap
  1 vacuum pump with cold trap and manometer.
  The apparatus used to measure the temperature consisted of:
  Testo 175-T3 temperature measuring instrument with IR serial interface
  thermocouple to remain in the hardened sample
  600 ml beaker (high mold) and a
  heater for the beaker (metal block, oil bath).

Procedure and Measurement:
Flask A was charged with 196.8 g of caprolactam and 3.2 g of activator, Flask B with 192 g of caprolactam, 8 g of Addonyl® Kat NL catalyst and, in the case of the inventive experiments, with 0.2 g of Addocat®105.

The melts from flasks A and B were prepared at 110-130° C. (±2° C.) in an oil bath under reduced pressure (<15 mbar) for 20 minutes.

After venting with nitrogen, components from flask A and flask B were combined in a three-neck flask, stirred briefly and transferred to the 600 ml beaker.

The mold temperature (beaker) was 160° C. The polymerization time was generally 10-20 minutes.

| Activator in flask A | No coactivator Pot life (s)/ experiment number | With coactivator Pot life (s)/ experiment number |
|---|---|---|
| Addonyl® 8108 (115° C.*) | 550/C1 | 400/I1 |
| Addonyl® 8108 (135° C.*) | 190/C2 | 200/C3 |
| Addolink® TT (125° C.*) | 700/C4 | 580/I2 |

C1, C2, C3 and C4 = comparative example,
I1 and I2 = inventive
*Starting temperature of the polymerization melt The examples show that the inventive composition leads to short pot lives even at temperatures below 130° C., where the polymerization proceeds slowly. In this way, it is possible to achieve shorter cycle times in the production of cast moldings by the different shaping processes, such as stationary, rotary or injection casting processes, combined with improved properties of the castings.

At temperatures above 130° C., the coactivator has no effect, as shown by comparative examples C2 and C3. These high starting temperatures are avoided, however, in the production of cast polyamide, since the polymerization can proceed in an uncontrolled manner and thus worsen the properties of the castings. In addition, the energy demand is higher here.

What is claimed is:

1. A cast polyamide comprising a reaction product of:
   a) a catalyst for the anionic polymerization of lactams;
   b) an activator for the anionic polymerization of lactams, wherein the activator is at least one compound selected from the group consisting of biurets, and uretdiones;
   c) at least one coactivator selected from the group consisting of tert-amines; and
   d) a lactam,
wherein the components a), b), c) and d) are combined and cast at a temperature of 80° C. to 130° C.

2. The cast polyamide as claimed in claim 1, wherein the catalyst is at least one compound selected from a group consisting of lactam magnesium halides, alkali metal aluminodilactamates, alkali metal and/or alkaline earth metal lactamates, potassium lactamates, and magnesium lactamates.

3. The cast polyamide as claimed in claim 1, wherein the activator is at least one biuret.

4. The cast polyamide as claimed in claim 1, wherein the activator is at least one uretdione.

5. The cast polyamide as claimed in claim 1, wherein:
   the coactivator is triethylenediamine;
   the lactam corresponds to lactams of the general formula

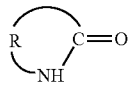

where R is an alkylene group having 3 to 13 carbon atoms; and the combined components are cast in an injection casting, stationary casting, or rotary casting process.

6. The cast polyamide as claimed in claim 1, wherein the components a), b) and c) are present in the following proportions based on the lactam:
a) 0.1 to 3% by weight,
b) 0.1 to 2% by weight, and
c) 0.0005 to 02% by weight.

7. A process for producing the cast polyamide as claimed in claim 1, the process comprising:
mixing at least one lactam melt with the catalyst a) to produce a first mixture,
mixing at least one lactam melt with the activator b) to produce a second mixture,
at least one of:
    mixing a lactam melt with the coactivator c) to produce a third mixture, and
    mixing the coactivator c) with at least one of:
        the first mixture of lactam melt and catalyst a), and
        the second mixture of lactam melt and activator b), and
combining the first mixture, the second mixture, and if the first and/or second mixture does not contain the coactivator c), also the third mixture at a temperature of 80° C. to 130° C. to produce a reaction mixture for polymerizing the lactam melts, and casting the reaction mixture at the temperature of 80° C. to 130° C.

8. A roller, a semifinished product or a sheet for mechanical engineering prepared with a polyamide according to claim 1.

9. The cast polyamide as claimed in claim 1, wherein:
the catalyst is at least one compound selected from a group consisting of lactam magnesium halides, alkali metal aluminodilactamates, alkali metal and/or alkaline earth metal lactamates, potassium lactamates and magnesium lactamates;
the activator is at least one compound selected from the group consisting of biurets, and uretdiones;
the lactam corresponds to compounds of general formula

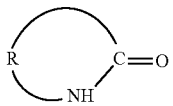

where R is an alkylene group having 3 to 13 carbon atoms; and
the temperature is 80° C. to <130° C.

10. The cast polyamide as claimed in claim 9, wherein components a), b) and c) are present in the following amounts based on the lactam:
a) 0.1 to 3% by weight,
b) 001 to 2% by weight, and
c) 0.0005 to 02% by weight.

11. The cast polyamide as claimed in claim 10, wherein the temperature is 110° C. to 130° C.

12. The cast polyamide as claimed in claim 11, wherein;
the coactivator is triethylenediamine;
the activator is at least one biuret; and
the lactam is at least one of caprolactam and laurolactam.

13. The cast polyamide as claimed in claim 11, wherein:
the coactivator is triethylenediamine;
the activator is at least one uretdione; and
the lactam is at least one of caprolactam and laurolactam.

14. The cast polyamide as claimed in claim 9, wherein:
components a), b) and c) are present in the following amounts based on the lactam:
a) 0.2 to 1.5% by weight,
b) 0.5 to 1% by weight, and
c) 0.005 to 0.1% by weight; and
the activator is at least one of: hexamethylene diisocyanate biuret and toluene diisocyanate uretdione;
the catalyst is sodium caprolactamate; and
the temperature is 110° C. to 130° C.

15. The cast polyamide as claimed in claim 1, wherein the cast polyamide is produced by reaction of at least:
a) sodium lactamate as an 18-20% by weight caprolactam solution,
b) at least one activator selected from the group consisting of a uretdione based on 2,4-diisocyanatotoluene, and a biuret of the formula (IV)

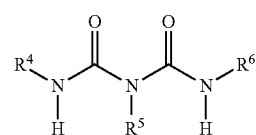

with p=6,
c) triethylenediamine, and
d) caprolactam.

16. The cast polyamide as claimed in claim 15, wherein:
the cast polyamide is produced by reaction of components a), b), c) and d);
components a), b) and c) are present in the following amounts based on the lactam:
a) 1 to 2% by weight,
b) 0.5 to 1% by weight, and
c) 0.005 to 0.1% by weight; and
the temperature is 110° C. to 130° C.

* * * * *